United States Patent [19]
Watanabe et al.

[11] Patent Number: 5,555,034
[45] Date of Patent: Sep. 10, 1996

[54] PROJECTION DISPLAY APPARATUS

[75] Inventors: Toshimitsu Watanabe; Makoto Kitamura; Takayuki Tanaka, all of Yokohama, Japan

[73] Assignee: Hitachi, Ltd., Tokyo, Japan

[21] Appl. No.: 262,336

[22] Filed: Jun. 17, 1994

[30] Foreign Application Priority Data

Jun. 30, 1993 [JP] Japan ..................................... 5-161771

[51] Int. Cl.$^6$ ..................................... H04N 9/31
[52] U.S. Cl. ............................ 348/746; 348/747
[58] Field of Search ..................................... 348/745, 746, 348/747, 778, 779, 780, 806, 807; 315/9, 11.5, 364, 368.11, 368.18, 368.19, 368.24, 368.28, 391, 394; 313/421, 426, 427, 428; 358/64; H04N 3/237, 3/233, 3/23, 3/223, 3/22, 9/09, 9/093, 9/097, 9/31

[56] References Cited

U.S. PATENT DOCUMENTS 3,015,691  1/1962  Poorter ..................................... 348/746

FOREIGN PATENT DOCUMENTS 0070083  3/1992  Japan ............................... H04N 9/31

*Primary Examiner*—David E. Harvey
*Attorney, Agent, or Firm*—Antonelli, Terry, Stout & Kraus

[57] ABSTRACT

A projection display apparatus having three projection tubes for the projection of images of different primary colors wherein the images from the projection tubes are projected on an enlarged scale onto a screen through projection lenses. The display apparatus includes a first deflection unit having at least a first deflection coil mounted on a neck portion of a first projection tube, a second deflection unit having at least a second deflection coil mounted on a neck portion of a second projection tube and a third deflection unit having at least a third deflection coil mounted on a neck portion of a third projection tube. According to a feature of the display apparatus, a first linearity correction coil is coupled in series with a parallel connection of the second deflection unit and only one of the first and third deflection units.

32 Claims, 11 Drawing Sheets

PROJECTION DISPLAY APPARATUS

FIELD OF THE INVENTION

The present invention relates to a display apparatus using cathode-ray tubes and, in particular, to a projection display apparatus using three projection tubes for projecting images of different primary colors onto a screen on an enlarged scale.

BACKGROUND OF THE INVENTION

FIG. 17 shows an example of a projection display apparatus using three projection lenses for projecting images of different primary colors, namely images of red, green and blue, onto a screen. The display apparatus includes a screen 101, projection lenses 102–104, projection tubes 105–107, deflection coils 108–110, convergence coils 111–113, deflection circuit 114, and convergence coil driving circuits 115–117 (B-CY, G-CY and R-CY drive circuits).

In the display apparatus, the same deflection waveform is supplied from the deflection circuit 114 to the deflection coils 108–110 which have the same characteristics or standard and which are mounted on the neck portions of the projection tubes 105–107, respectively. As a result, images of different primary colors, namely red, green and blue, are formed on the front surfaces of the projection tubes 105–107, then enlarged by the projection lenses 102–104 and projected on the screen 101 in an overlapped manner, whereby an enlarged color image is formed on the screen.

In such a projection display apparatus, there generally is adopted an in-line arrangement (arrangement in the horizontal direction) of the projection tubes 105–107. Particularly, the green projection tube 106 is disposed at the center, and on opposite sides thereof are disposed respectively the red and blue projection tubes 107, 105. The green projection tube 106 is disposed in a straight manner just in front of the screen, while the red and blue projection tubes 107, 105 are disposed in a slightly inwardly inclined state, that is, inclined toward the green projection tube 106. The angle of this inward inclination is designated as the "convergence angle".

According to the recent type of projection display apparatus, lenses of a short focal length are used as the projection lenses 102–104 to shorten or reduce the projection distance L between those projection lenses and the screen 101 and thereby effect a thinning or depth reduction of the apparatus. However, with shortening of the distance L, not only the projection lenses 102–104 increase in field angle, but also the convergence angle tends to become larger. Consequently, the red and blue images projected on the screen 101 are largely distorted. As a result, the red, green and blue images are no longer registered on the screen.

For correcting such a distortion and registering the red, green and blue images, there has been proposed a construction wherein convergence coils 111–113 are mounted on the neck portions of the projection tubes 105–107, and correction waveforms are fed thereto from convergence coil driving circuit 115–117, respectively, as described in Japanese Patent Publication No. 49433/88. However, when the aforementioned distortion is large, it is required to increase the amount of correction in the convergence coil driving circuits 115–117.

Such an increase of the amount of correction in the convergence coil driving circuits give rise to various problems as follows:

(1) Increase in output of the convergence coil driving circuits 115–117 causes an increase of the power consumption and a great increase of cost.

(2) Increase in magnetic field of the convergence coils 111–113 causes an increase of electron beam spot distortion and deterioration of resolution.

(3) Increase in the amount of correction of the convergence coil driving circuits 115–117 gives rise to a change in scanning lines of electron beam, thus causing deterioration of S/N ratio.

(4) Increase in the amount of heat generated in the convergence coils 111–113.

Heretofore, for solving the above-mentioned problems, there have been adopted, for example:

(a) a method wherein the red and blue projection tubes 107, 105 are disposed without inclination to prevent distortion of the projected image on the screen 101, as described in Japanese Patent Publication No. 47518/84; and (b) a method wherein a portion of the distortion based on the convergence angle is corrected beforehand in the deflection circuit, as described in Japanese Patent Application Laid-Open No. 48872/82.

According to the above method (a), when the projection distance is extremely short, the raster size on each projection tube becomes extremely small, so that there arises another problem relating to brightness and resolution. And according to the above method (b), it is impossible to obtain a satisfactory effect of correction.

Red and blue raster distortions induced by the increase of field angle or convergence angle can be broadly classified into two distortion components—keystone distortion and horizontal linearity distortion. Particularly, the increase of the horizontal linearity distortion is conspicuous.

Another technique is described in Japanese Patent Application Laid-Open No. 56590/83. According to this technique, in order to solve the above-mentioned problems, a linearity correction arrangement is connected to each deflection coil mounted on projection tubes.

FIG. 18 is a circuit diagram showing an example of three linearity correction coils used in a projection display apparatus having a horizontal drive pulse input terminal 1, a horizontal output transistor 2, a damper diode 3, a resonance capacitor 4, a power supply terminal 5, a transformer 6, horizontal deflection coils 7–9, linearity correction coils 10–12, and an S-correction capacitor 13. The horizontal output transistor 2, damper diode 3 and resonance capacitor 4 constitute a portion of a horizontal deflection circuit, and a saw tooth-like horizontal deflection current is formed by switching the horizontal output transistor 2 in accordance with a horizontal drive pulse of a horizontal scan period provided from the input terminal 1.

The horizontal deflection coil 8 is mounted on the neck portion of a projection tube corresponding to the green projection tube 106 shown in FIG. 17, which projection tube associated with the coil 8 will hereinafter be referred to as the projection tube 106, correspondingly to FIG. 17, for ease of explanation. In series with the horizontal deflection coil 8 is connected to the linearity correction coil 11. Likewise, the horizontal deflection coils 7 and 9 are mounted on the neck portions of projection tubes corresponding to the red and blue projection tubes 107, 105, respectively, shown in FIG. 17, which projection tubes associated with the coils 7 and 9 will hereinafter be referred to as the projection tubes 107 and 105, correspondingly to FIG. 17, for ease of explanation. In series with the horizontal deflection coils 7 and 9 are connected the linearity correction coils 10 and 12, respectively.

The horizontal deflection coils 7 to 9 are connected to the power supply terminal 5 through the transformer 6, while the linearity corrections coils 10 to 12 are grounded through the S- correction capacitor 13. The foregoing horizontal deflection current is fed to the horizontal deflection coils 7–9 simultaneously. The linearity corrections coils 10, 11 and 12 serve for correcting the horizontal linearity of the projection tubes 107, 106 and 105, respectively. For example, they are magnetically biased and possess the following characteristics.

The linearity correction coil 11 connected to the horizontal deflection coil S has a characteristic indicated by curve 22 in FIG. 19. FIG. 19 represents the magnitude of inductance of each linearity correction coil relative to the magnitude of DC superimposed current in the coil. In the case where the linearity correction coil 11 is disposed as in FIG. 18, the DC superimposed current corresponds to the foregoing horizontal deflection current, which is at a maximum negative level at the beginning of the horizontal scan and shifts from zero to the positive side as the horizontal scan proceeds. Thus, when the DC superimposed current is negative, the horizontal scan is at its first half period, and the DC superimposed current becomes positive at the second half of the horizontal scan period.

As is apparent from the characteristic curve 22 shown in FIG. 19, the linearity correction coil 11 exhibits a large inductance at the first half of the horizontal scan period so that the effect of linearity correction is greater than at the second half of the same period. The reason why the effect of linearity correction is made different between the first and second halves of the horizontal scan period is that at the latter half of the same period, the saturation voltage of the horizontal output transistor 2 becomes high and so it is intended to prevent the horizontal deflection current of saw-tooth shape from assuming a waveform which shows a tendency for saturation. In the case where a plurality of vertical lines to be displayed as lines spaced at equal intervals are displayed as an image 25 on the front surface of the projection tube 106, as shown in FIG. 20, the vertical line intervals are almost constant as a result of the linearity correction made above.

The linearity correction coil 10 connected to the horizontal deflection coil 7 has a characteristic indicated curve 21 in FIG. 19. Thus, at the first half of the horizontal scan period, the inductance of the coil 10 is smaller than that of the coil 11, that is, the linearity correction is less effective. Consequently, as shown in FIG. 20, an image 24 on the front surface of the projection tube 107 extends in the horizontal direction at the first half of the horizontal scan period and contracts in the same direction at the second half of the same period.

The linearity correction coil 12 connected to the horizontal deflection coil 9 has a characteristic indicated by curve 23 in FIG. 19. More particularly, at the first half of the horizontal scan period, the inductance of the coil 12 is larger and the effect of linearity correction is greater in comparison with the linearity correction coil 10. Consequently, an image 26 on the front surface of the projection tube 105 contracts in the horizontal direction at the first half of the horizontal scan period and extends in the same direction at the second half of the same period, as shown in FIG. 20.

The image 25 on the projection tube 106, shown in FIG. 20, is projected enlargedly onto a screen by a projection lens to afford such a raster 28, as shown in FIG. 21. The image 24 on the projection tube 107, shown in FIG. 20, is also projected enlargedly onto the screen by a projection lens to afford such a raster 29, as shown in FIG. 21. Further, the image 26 on the projection tube 105, shown in FIG. 20, is also projected enlargedly onto the screen of a projection lens to afford such a raster, as shown in FIG. 21. The horizontal linearity of the raster 29 and that of the raster 27 can be made approximately coincident with that of the raster 28 although keystone distortion remains therein.

Each linearity correction arrangement, as indicated above, acts on a deflecting coil corresponding to a projection lens arrangement, wherein the raster extends at the first half of the electron beam scan period, in such a manner that the inductance thereof is large at the first half of the electron beam scan period, and becomes small at the second half of the same period, to correct the linearity distortion of the projection optical system. On the other hand, it acts on a deflecting coil corresponding to a projection lens arrangement, wherein the raster extends at the latter half of the electron beam scan period, in such a manner that the inductance thereof is small at the first half of the same period to correct the linearity distortion of the projection optical system.

Therefore, it is no longer necessary to make correction of the horizontal linearity distortion with respect to the correction signal in each convergence coil driving circuit, whereby the burden on the convergence coil driving circuit can be diminished and, hence, the power consumption can be reduced, and at the same time, it is made possible to improve the resolution and S/N ratio.

SUMMARY OF THE INVENTION

It is an object of the present invention to provide a projection display apparatus of a compact structure capable of preventing the increase of the horizontal linearity distortion and diminishing the burden on the convergence coil driving circuits.

In accordance with the present invention, there is provided a projection display apparatus having three projection tubes for the projection of images of different primary colors, the images from the projection tubes being projected on an enlarged scale onto a screen through projection lenses. The apparatus includes a first deflection unit having at least a first deflection coil mounted on a neck portion of a first projection tube, a second deflection unit having at least a second deflection coil mounted on a neck portion of a second projection tube, and a third deflection unit having at least a third deflection coil mounted on a neck portion of a third projection tube.

According to a feature of the present invention, the display apparatus is provided with a linearity correction coil coupled in series with a parallel connection of the second deflection unit and only one of the first and third deflection units.

According to another feature of the present invention, the display apparatus is provided with a linearity correction coil having at least first, second and third terminals. The first and second terminals are end terminals and the third terminal is an intermediate terminal disposed between the first and second terminals. At least one of the first and second terminals is coupled to one of the first and third deflection units, and the third terminal is coupled to the second deflection unit.

According to a further feature of the present invention, the display apparatus is provided with a first linearity correction coil coupled in series with one of the first, second and third deflection units, a second linearity correction coil coupled in series with another of the first, second and third deflection units, and the first and second linearity correction coils are coupled to only two of the first, second and third deflection coils.

In accordance with another feature of the present invention, the display apparatus is provided with a first linearity correction coil coupled to the first deflection coil, a second linearity correction coil coupled to the second deflection coil, and a third linearity correction coil coupled to the third deflection coil. The direction of magnetic bias of the first linearity correction coil is opposite to those of the second and third linearity correction coils.

According to still another feature of the present invention, the display apparatus is provided with a first linearity correction coil coupled to the first deflection coil, a third linearity correction coil coupled to the third deflection coil. Further, there is provided a raster size coil for controlling raster size coupled to only one of the first, second and third deflection units.

In accordance with a further feature of the present invention, the display apparatus is provided with a first linearity correction coil coupled to the first deflection coil, a second linearity correction coil coupled to the second deflection coil, a third linearity correction coil coupled to the third deflection coil. Further, there is provided a first raster size coil for controlling raster size being coupled to only one of the first, second and third deflection units, a second raster size coil for controlling raster size being coupled to another of the first, second and third deflection units, and the first and second raster size coils are coupled to only two of the first, second and third deflection units.

These and other objects, features and advantages of the present invention will become more readily apparent from the following detailed description when taken in conjunction with the accompanying drawings.

DETAILED DESCRIPTION OF THE DRAWINGS

Embodiments of the present invention will be described below with reference to the accompanying drawings, wherein the projection tubes are arranged with respect to a screen in the manner illustrated in FIG. 17.

Figure 1:
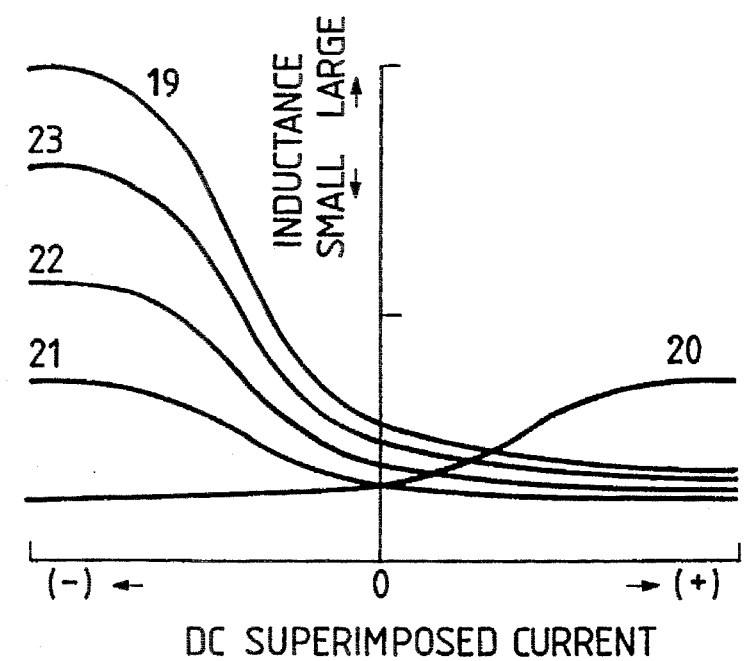
FIG. 1 shows characteristic curves for a projection display apparatus according to embodiments of the present invention.
Figure 2:
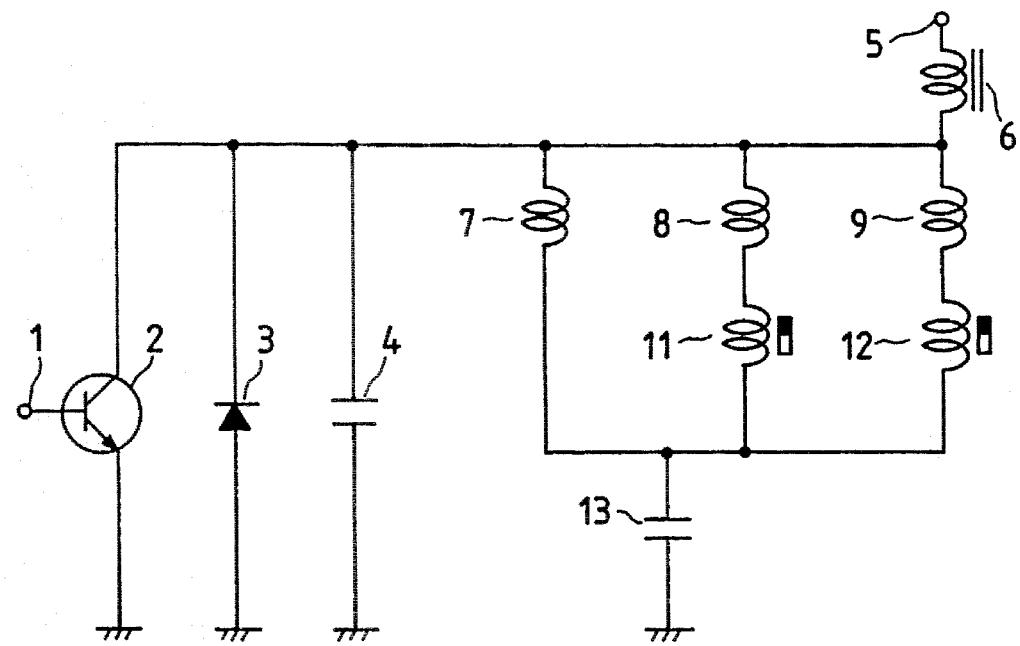
FIG. 2 is a circuit diagram of a projection display apparatus according to an embodiment of the present invention.
Figure 3:
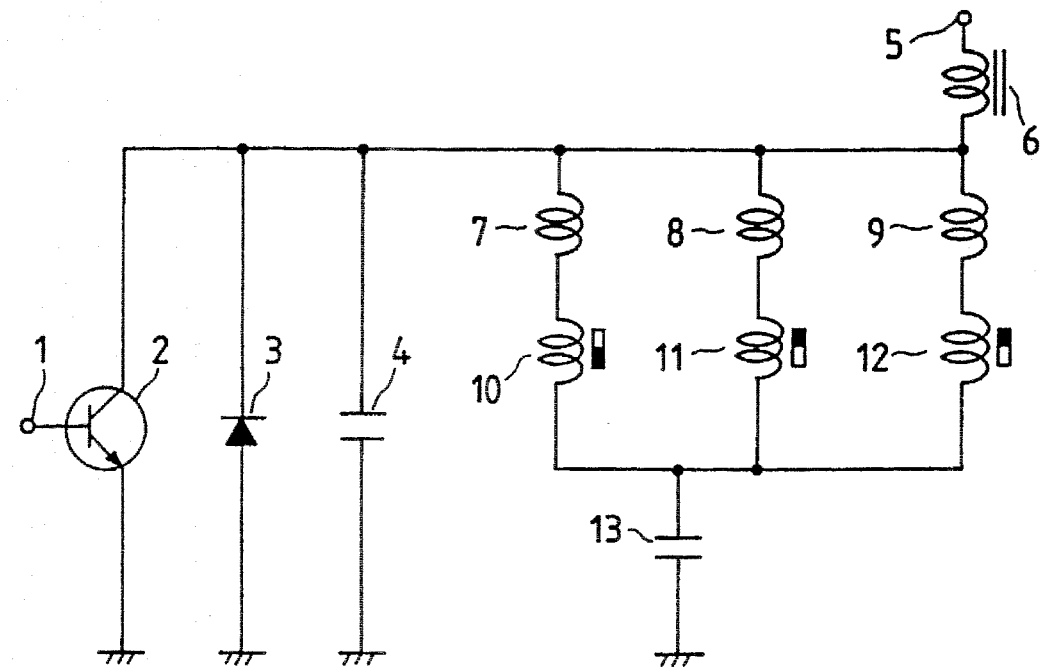
FIG. 3 is a circuit diagram of a projection display apparatus according to another embodiment of the present invention.

The characteristics curve 23, as shown in FIG. 1, can be attained by making the number of turns of the linearity correction coil 12 larger than that of the linearity correction coil 11. The characteristics curve 21, as shown in FIG. 1, can be attained by making the number of turns of the linearity correction coil 10 smaller than that of the linearity correction coil 11. As shown in FIG. 2, however, the linearity correction coil 10 can be omitted by making optimization for a desired set. Moreover, it is sometime required that the direction of linearity correction by the linearity correction coil 10 for the projection tube 107 be made opposite to the foregoing direction, as indicated by a characteristic curve 20 in FIG. 1. As shown in FIG. 3, this requirement can be satisfied by making the direction of magnetic bias of the coil 10 opposite to that adopted in FIG. 18.

Figure 4:
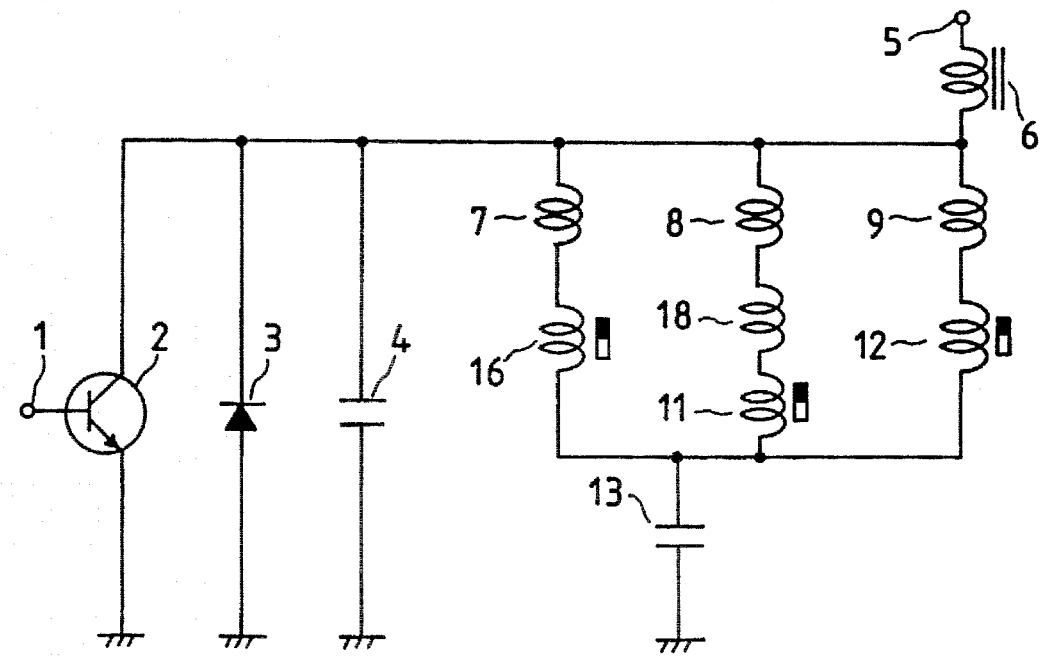
FIG. 4 is a circuit diagram of a projection display apparatus according to another embodiment of the present invention.

For the characteristics curves 23 and 22, shown in FIG. 1, there may be different raster sizes on the front surfaces of the projection tubes because the associated linearity correction coils are different in inductance from each other in the case where the DC superimposed current is zero. Such a problem can be solved by disposing a raster size coil 18 for controlling the raster size between the horizontal deflection coil 8 on the projection tube 106 and the linearity coil 11, as shown in FIG. 4. In this embodiment, a linearity correction coil 16, which has an opposite direction of magnetic bias to that of the coil 10, i.e. in the same direction as the other linearity correction coils, is used instead of the coil 10.

Figure 5:
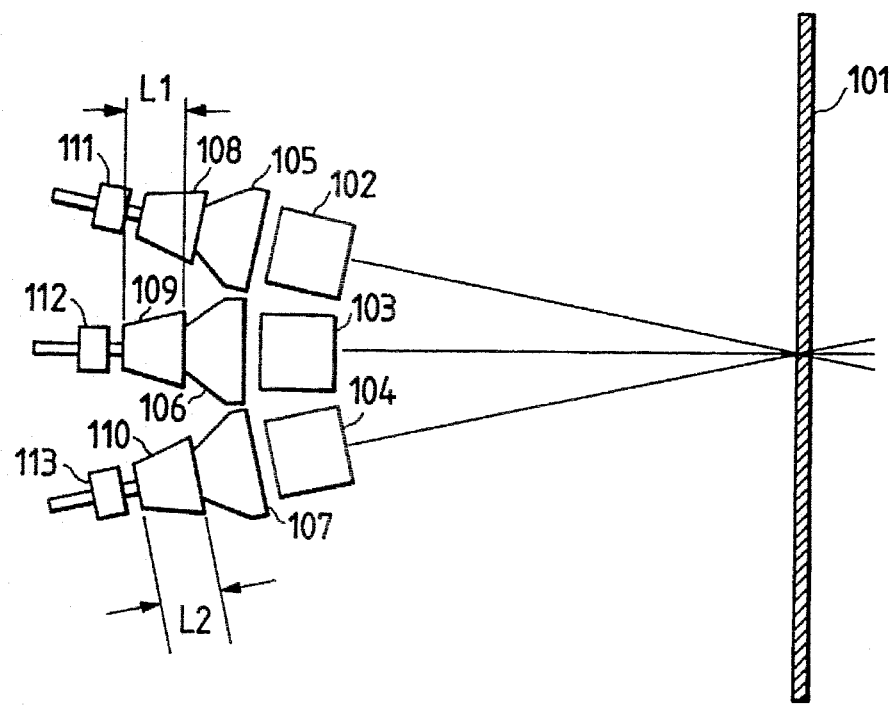
FIG. 5 shows a display apparatus arrangement for explaining the operation of the embodiment of FIG. 4.
Figure 17:
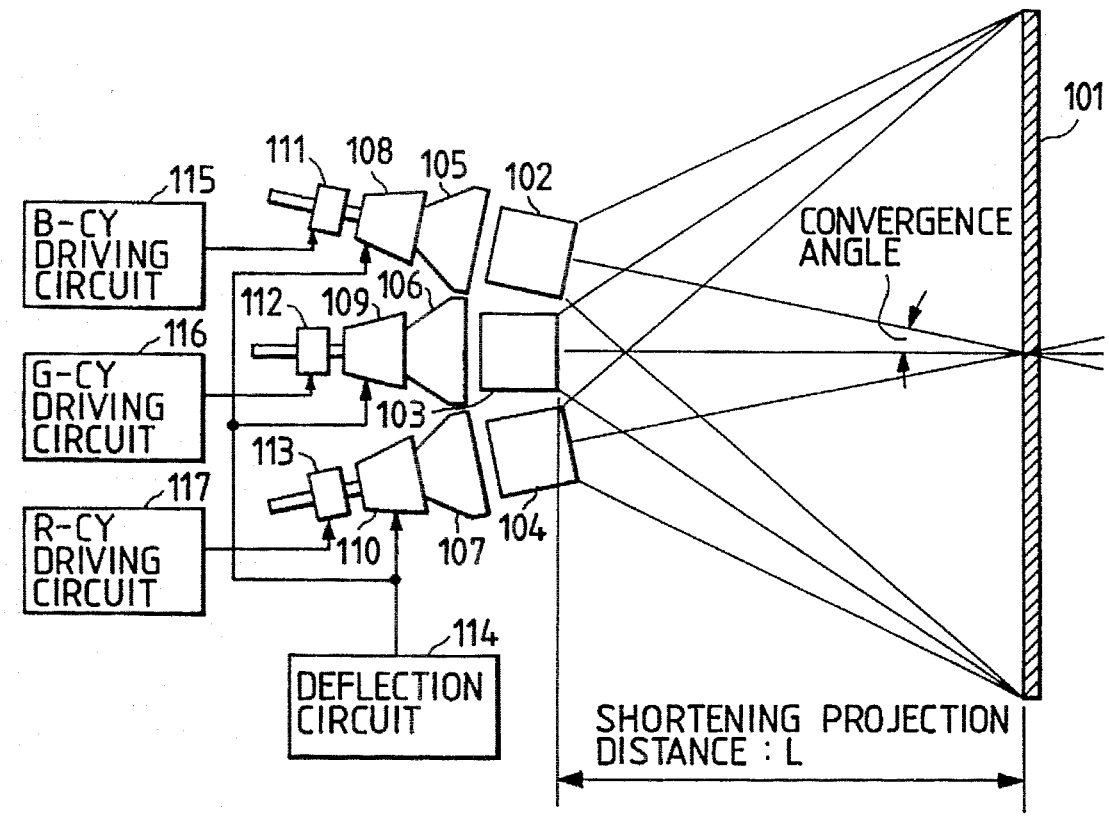
FIG. 17 shows a conventional projection display apparatus.

FIG. 5 shows a display apparatus arrangement of the present invention which is different from the prior structure shown in FIG. 17 for explaining the operation of FIG. 4. The deflection coil 109 which is disposed at the center, could be used on the condition that the deflection coil 109 was longer than the other deflection coils 108 and 110 (L1>L2). The reason why L1>L2 is to decrease the electric correction of the convergence coils 111–113. The electric correction represents the electricity of vertical convergence coils of red, green and blue. The horizontal size, however, would be large, when the relationship of the distance is L1>L2, although the vertical size could be made optimal. Then, the raster size coil 18 serves an important roll in order to enable the horizontal size to be made small.

Figure 6:
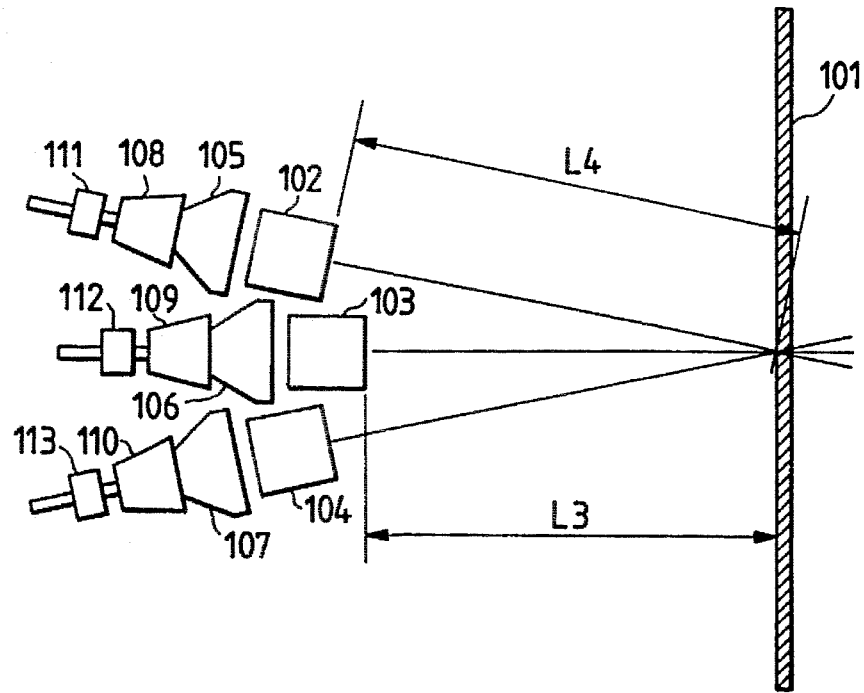
FIG. 6 shows another display apparatus arrangement for explaining the operation of the embodiment of FIG. 4.
Figure 7:
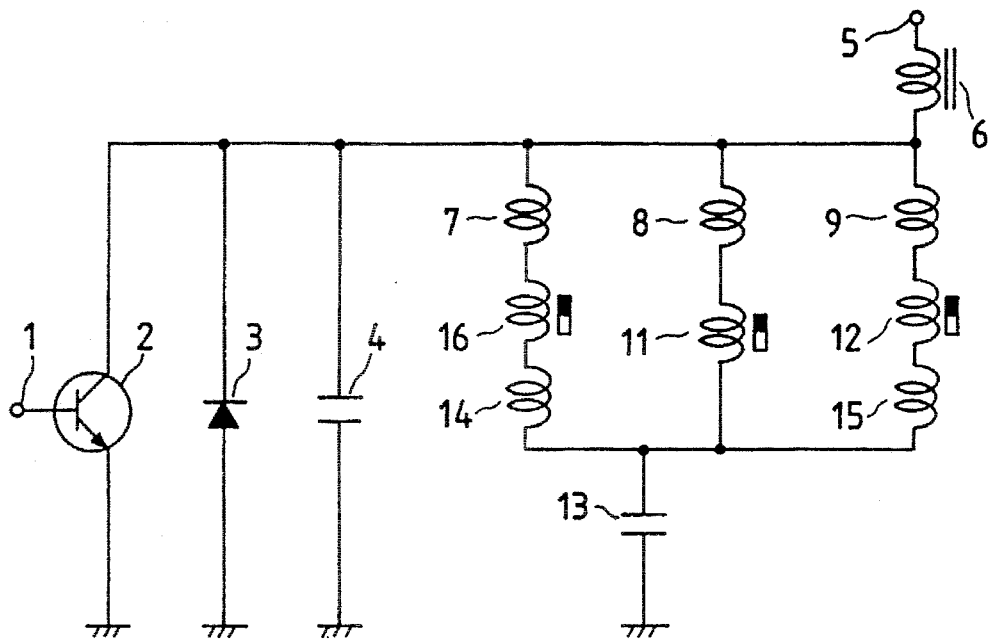
FIG. 7 is a circuit diagram of a projection display apparatus according to another embodiment of the present invention.

On the other hand, other deflection units also have an advantage by using the raster size coil coupled to a linearity correction coil. As shown in FIG. 6, when the relationship between the distance of L3 and the distance of L4 is L3<L4, there is obtained a so-called optical system of variable magnification wherein the optical magnification of a projection unit disposed as an offset becomes large. It would be used as needed to maintain the raster margin of a projection tube. A circuit structure of FIG. 7, therefore, is required in order to decrease the raster size of projection tubes 102, 104, contrary to the above structures. In FIG. 7, raster size coils 14 and 15 are coupled to linearity correction coils 10 and 12, respectively for controlling raster size. In the above embodiment, the circuit cost does not increase much because the electric current range used becomes smaller and, hence, a small-sized core and magnet are employable.

Figure 8:
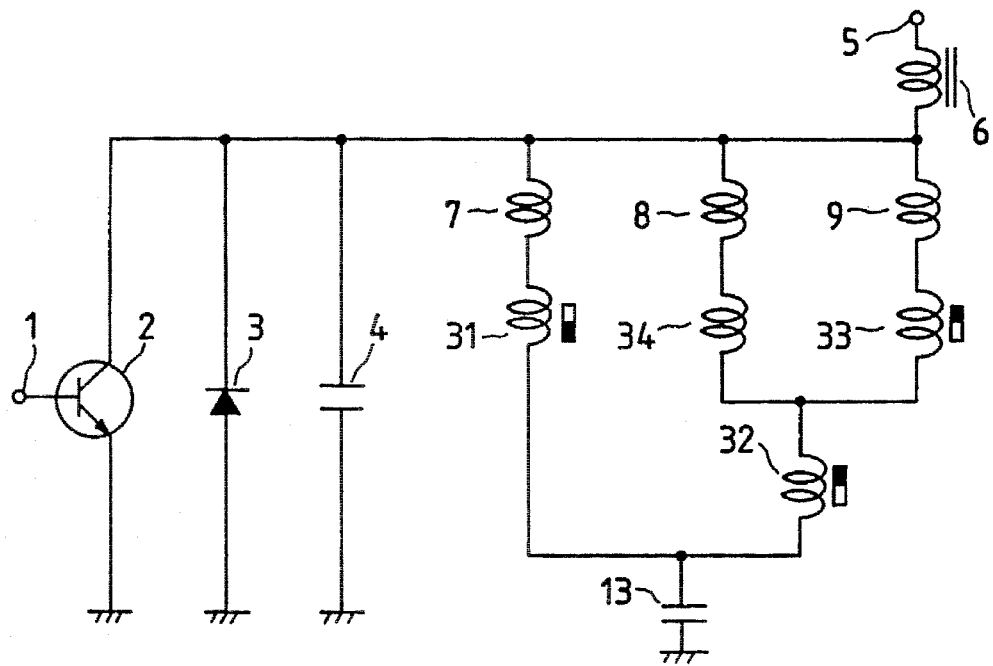
FIG. 8 is a circuit diagram of a projection display apparatus according to a further embodiment of the present invention.
Figure 18:
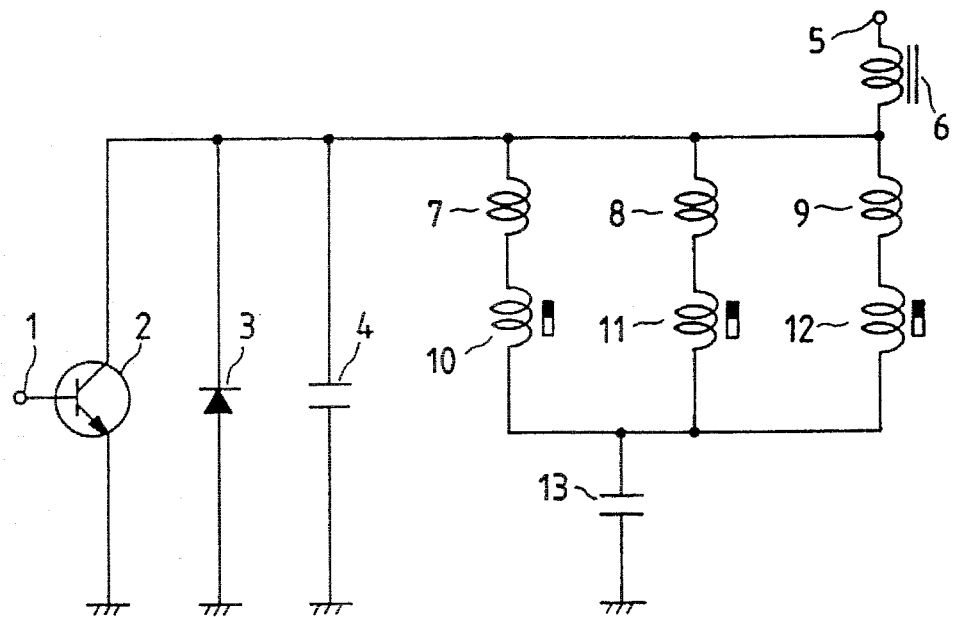
FIG. 18 is a circuit diagram of a projection display apparatus according to the prior art.
Figure 19:
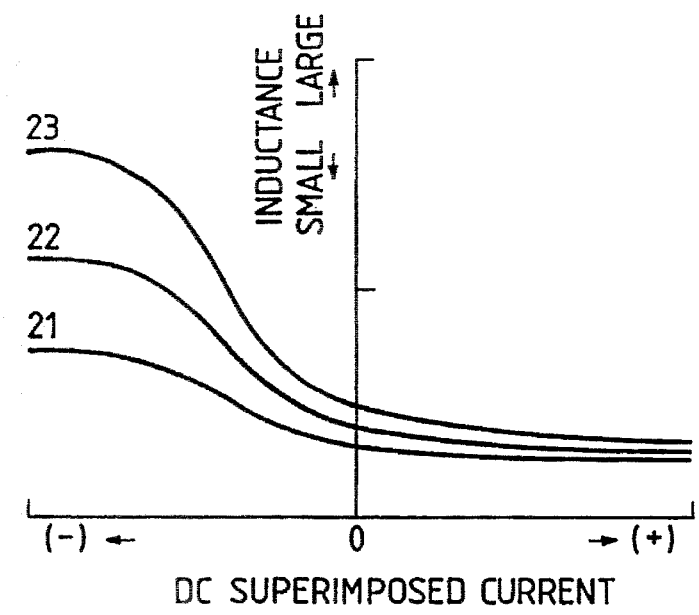
FIG. 19 shows characteristic curves for linearity correction coils according to the prior art.
Figure 20:
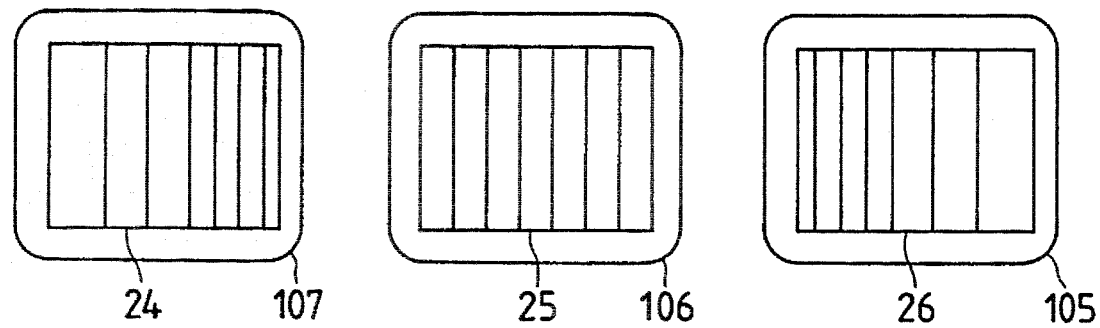
FIG. 20 is a diagram showing images formed on projection tubes in accordance with the circuit of FIG. 18.
Figure 21:
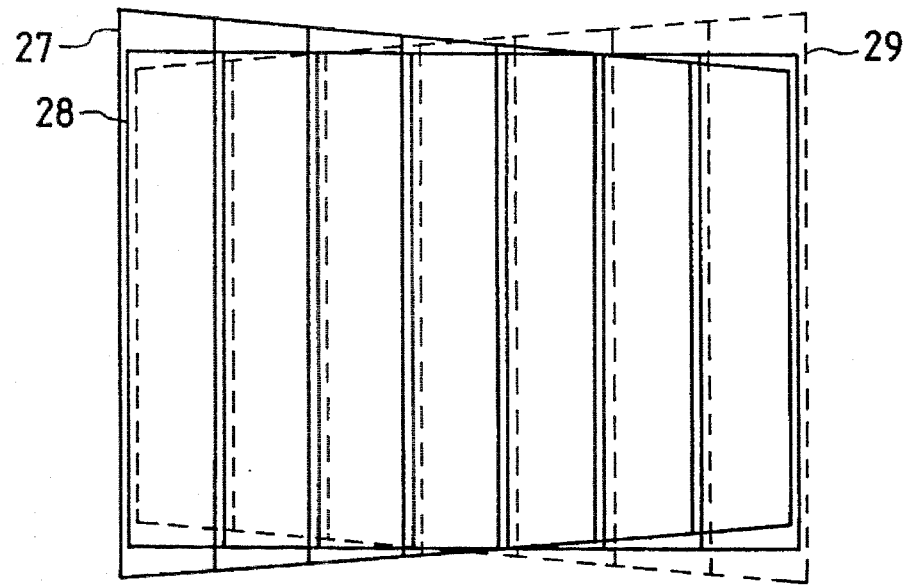
FIG. 21 is a diagram showing rasters obtained by projecting the images shown in FIG. 20 onto a screen in an enlarged manner.

FIG. 8 is a circuit diagram of a projection display apparatus, according to another embodiment of the present invention utilizing linearity correction coils 31–33 and a raster size coil 34, with the portions common to FIG. 18 being indicated by the same reference numerals. According to this embodiment, the amount of linearity correction in the case of using a projection lens of a short optical projection distance can be made larger than that in the prior art shown in FIG. 18.

In FIG. 8, the raster size coil 34 is coupled in series with the horizontal deflection coil 8 on the projection tube 106, and the linearity correction coil 33 is coupled in series with the horizontal deflection coil 9 on the projection tube 107. The series circuit of the 15 horizontal deflection coil 8 and the raster size coil 34 and the series circuit of the horizontal deflection coil 9 and the linearity correction coil 33 are coupled in parallel with each other. In series with this parallel circuit is coupled with the linearity correction coil 32. Further, the linearity correction coil 31 is coupled in series with the horizontal deflection coil 7 on the projection tube 105, and the other ends of the coils 31 and 32 are grounded through the S-correction capacity 13.

The direction of the magnetic bias of the linearity correction coil 31 is opposite to that of the linearity correction coil 32, so that the coil 31 has the characteristic curve 20 shown in FIG. 1. As to the linearity correction coil 33, since it is coupled in series with the linearity correction coil 32, its overall characteristic, when viewed from the horizontal deflection coil 9, corresponds to the characteristic curve 19, as shown in FIG. 1, and thus, it is possible to make a large linearity correction in the projection tube 105. The raster size coil 34 serves for making the amplitude of the saw tooth-shaped horizontal deflection current flowing through the horizontal deflection coil 8 small and for making the raster size in the projection tube 106 almost equal to that in the projection tubes 107 and 105 with the horizontal deflection coils 7 and 9 attached thereto.

Figure 9:
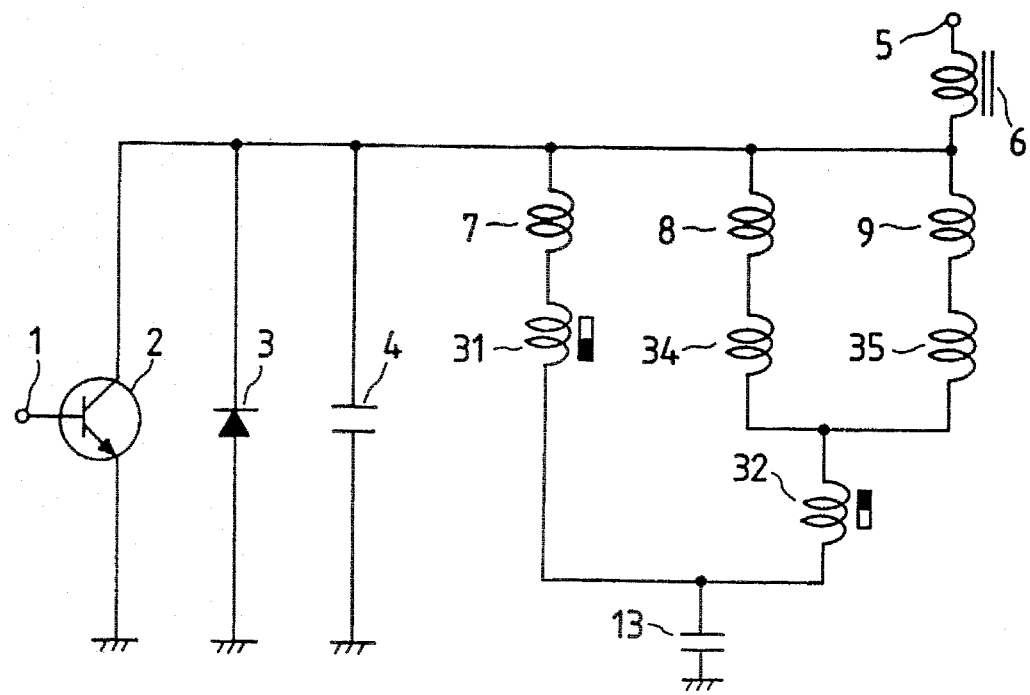
FIG. 9 is a circuit diagram of a projection display apparatus according to another embodiment of the present invention.

As shown in FIG. 9, which is a circuit diagram of another embodiment of the present invention of a projection display apparatus, a raster size coil 35 is coupled to the horizontal deflection coil 7, instead of the linearity correction coil 33. This embodiment also provides an effect corresponding to the embodiment illustrated in FIG. 8. In FIG. 9, the portions common to FIG. 8 are indicated by the same reference numerals.

Figure 10:
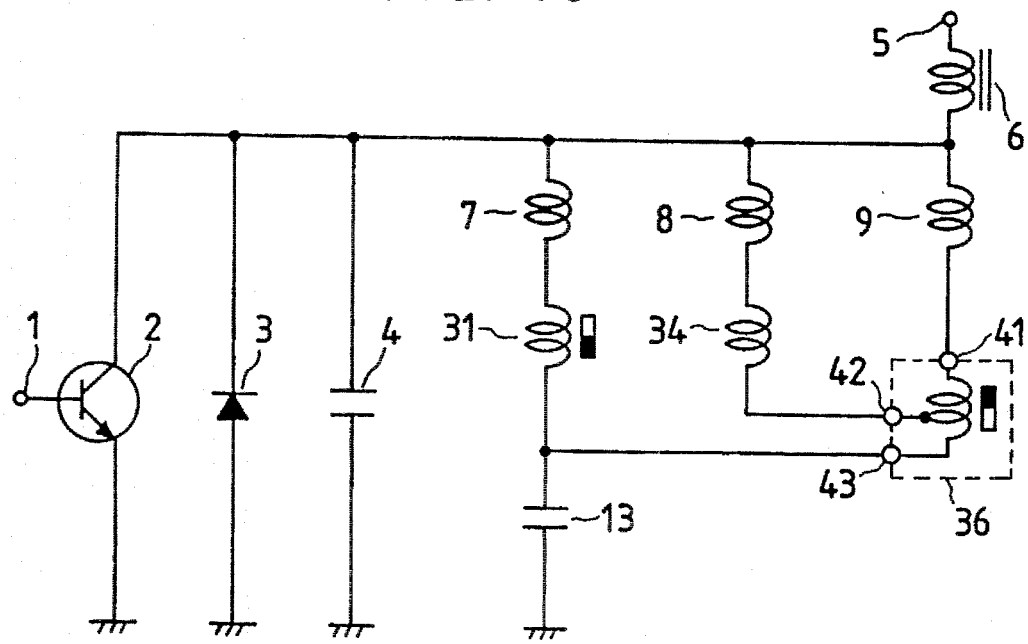
FIG. 10 is a circuit diagram of a projection display apparatus according to yet another embodiment of the present invention.

FIG. 10 is a circuit diagram of a projection display apparatus according to a further embodiment of the present invention, in which the numeral 36 denotes a linearity correction coil with a tap. The coil 36 is provided with the one end terminal 41, a center tap 42 and another end terminal 43, with the portions common to the foregoing drawings being indicated by the same reference numerals.

Also in this embodiment, like the embodiment illustrated in FIG. 8, it is intended to provide a larger amount of linearity correction than in the circuit shown in FIG. 18, with the number of components required being made smaller than in the embodiment shown in FIG. 8.

In FIG. 10, the linearity correction coil 36 with the tap is substrated, for the linearity correction coils 33 and 32 in FIG. 8, and is coupled in series with the horizontal deflection coil 9 on the projection tube 105. The terminal 43 of the coil 36 on the side opposite to the terminal 41 to which the horizontal deflection coil 9 of the coil 36 is connected, and the other end of the linearity correction coil 31 coupled in series with the horizontal deflection coil 7 on the projection tube 107 are grounded through the S-correction capacitor 13. Further, the other end of the size coil 34 which is coupled in series with the horizontal deflection coil 8 on the projection tube 106 is coupled to the center tap 42 of the linearity correction coil 36.

The horizontal deflection coil 9 and the linearity correction coil 36 constitute a deflection unit for the projection tube 105. On the other hand, the horizontal deflection col 8, the raster size coil 34 and the portion of the linearity correction coil 36 extending from the center tap 42 to the terminal 43 constitute a deflection unit for the projection tube 106.

Between the terminals 41 and 43, the coil 36 exhibits the characteristic curve 19 shown in FIG. 1, while between the center tap and the terminal 43, the coil 36 shows the characteristic curve 22 in FIG. 1, and the linearity correction coil 31 has the characteristic curve 20 shown in FIG. 1, so that the same effect as in the embodiment illustrated in FIG. 8 is obtained. Further, since the single linearity correction coil 36 with the tap is used in place of the two linearity correction coils 32 and 33 used in the embodiment shown in FIG. 8, the number of components required can be reduced, which is advantageous in the point of circuit board area and components costs.

Figure 11:
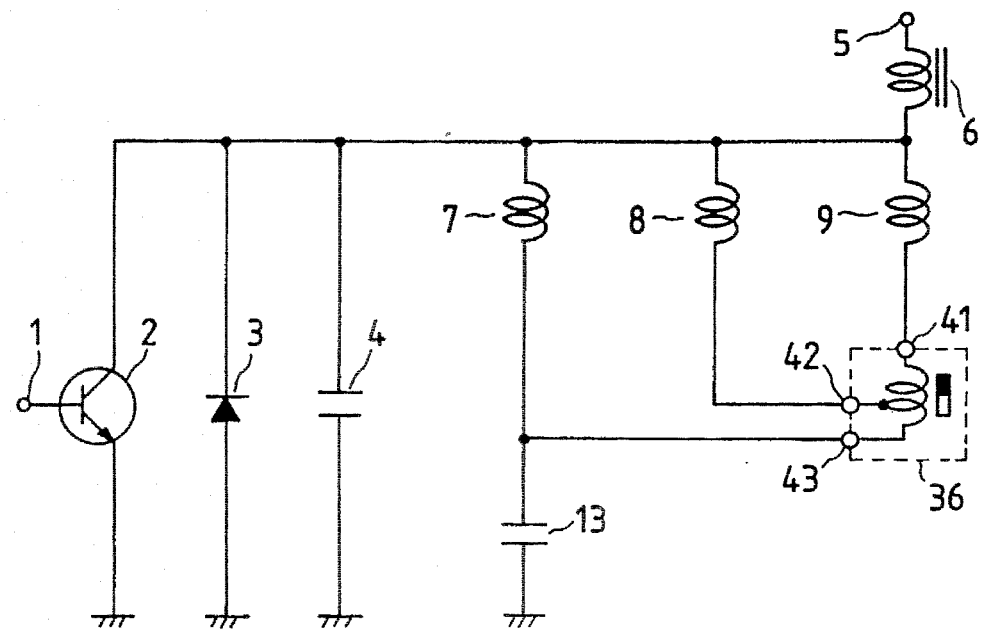
FIG. 11 is a circuit diagram of a projection display apparatus according to a still further embodiment of the present invention.
Figure 12:
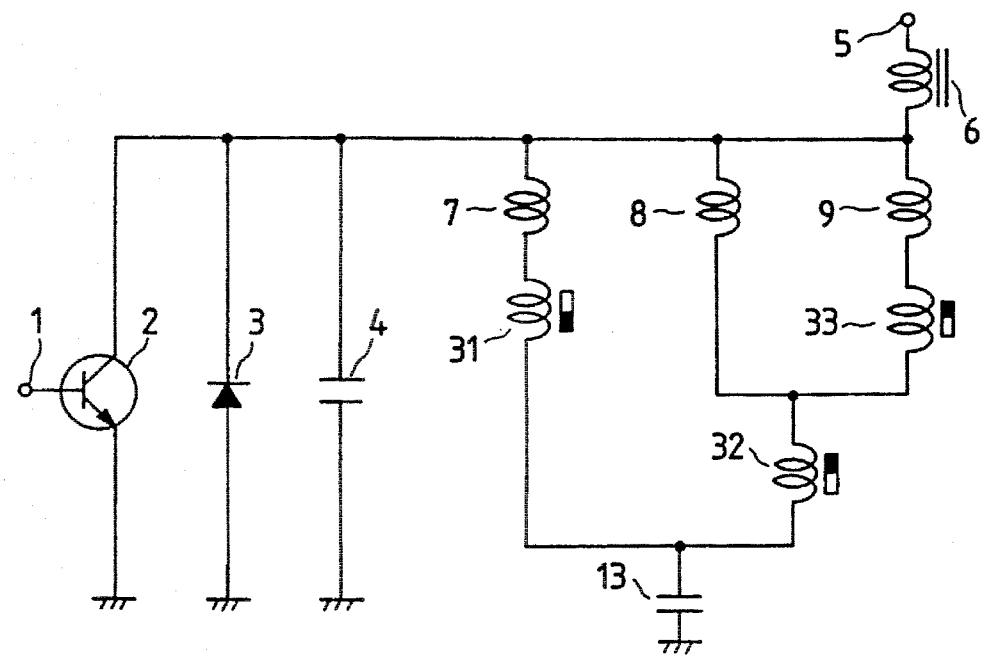
FIG. 12 is a circuit diagram of a projection display apparatus according to another embodiment of the present invention.
Figure 13:
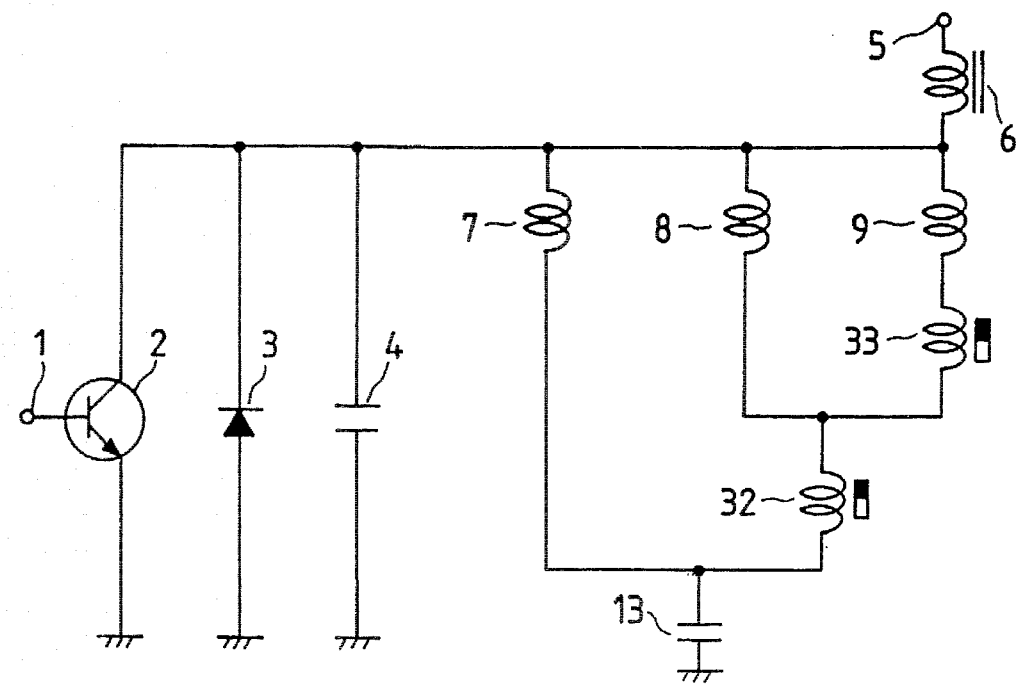
FIG. 13 is a circuit diagram of a projection display apparatus according to yet another embodiment of the present invention.

The linearity correction coil 10 coupled in series with the horizontal deflection coil 7 can be omitted, according to characteristics and specifications of a desired set, as in FIG. 2, but also in the embodiment illustrated in FIG. 10, the linearity correction coil 31 and further, the raster size coil 34 can be omitted as in FIG. 11. This is also true of the embodiments shown in FIGS. 12 and 13, which have features similar to the embodiment shown in FIG. 8.

Figure 14:
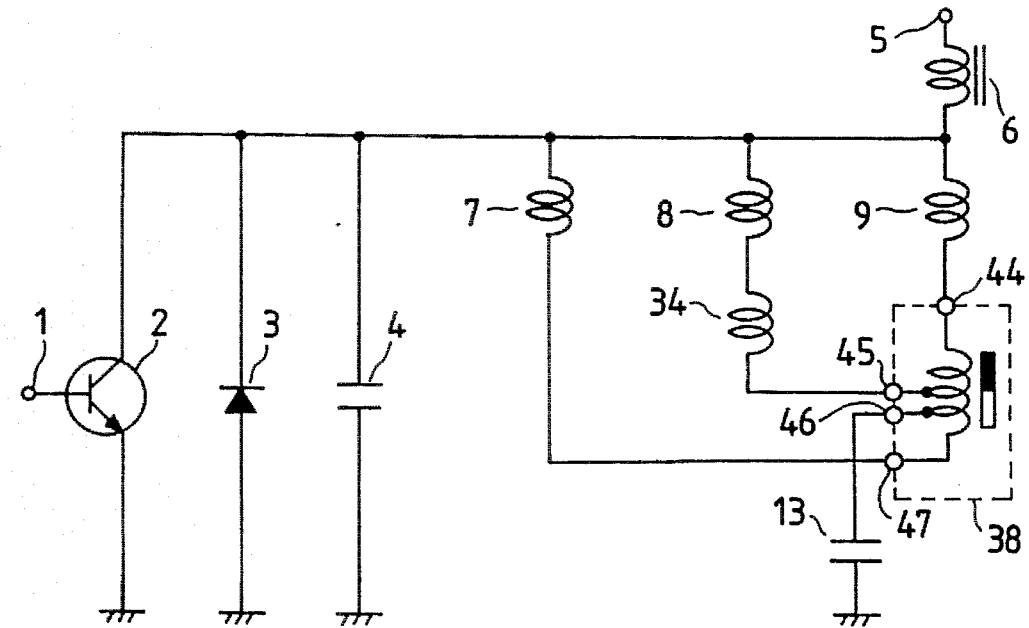
FIG. 14 is a circuit diagram of a projection display apparatus according to a further embodiment of the present invention.

FIG. 14 is a circuit diagram of a projection display apparatus according to a still further embodiment of the present invention, in which the numeral 38 denotes a linearity correction coil with taps. The coil 38 includes one end terminal 44, center taps 45 and 46, and another end terminal 47, with the portions common to FIG. 10 being indicated by the same reference numerals.

In this embodiment, the linearity correction coil 38 having two center taps 45 and 46 is used in place of both the linearity correction coil 31 and the linearity correction coil 36 with the tap shown in FIG. 10. More specifically, the horizontal deflection coils 7 and 9 are coupled respectively to the terminals 44 and 47 of the linearity correction coil 38 on the sides opposite to each other and, are thereby coupled in series through the coil 38. The raster size coil 34 is coupled to one center tap 45 of the coil 38, while the other center tap 46 of the coil 38 is grounded through the S-correction capacitor 13.

The horizontal deflection coil 7 and the portion of the linearity correction coil 38 with the taps extending from the terminal 47 to the center tap 46 constitute a deflection unit for the projection tube 107. The horizontal deflection coil 8, the raster size coil 34 and the portion between the center taps 45 and 46 of the coil 38 constitute a deflection unit for the projection tube 106. Further, the horizontal deflection coil 9 and the portion from the terminal 44 to the center tap 46 of the coil 38 constitute a deflection unit for the projection tube 105. Between the terminal 44 and the center tap 46, the linearity correction coil 38 exhibits the characteristic curve 19, shown in FIG. 1, while between the center taps 45 and 46 there can be obtained the characteristic curve 22, shown in FIG. 1. Further, between the terminal 47 and the center tap 46, there is obtained the characteristic curve 20, shown in FIG. 1, because the direction of the magnetic bias is reversed.

Thus, also in this embodiment, in the case of using a projection lens of a short optical projection distance, it is possible to provide a larger amount of linearity correction than in the circuit illustrated in FIG. 18. Additionally, the number of components required can be made smaller than in the embodiment shown in FIG. 10, which is advantageous in the point of the circuit board area and component cost. Further, since the current from the horizontal deflection coil 7 and that from the horizontal deflection coils 8 and 9 flow in opposite directions, the sizes of core and magnet used in the linearity correction coil 38 can be designed to be smaller.

Figure 15:
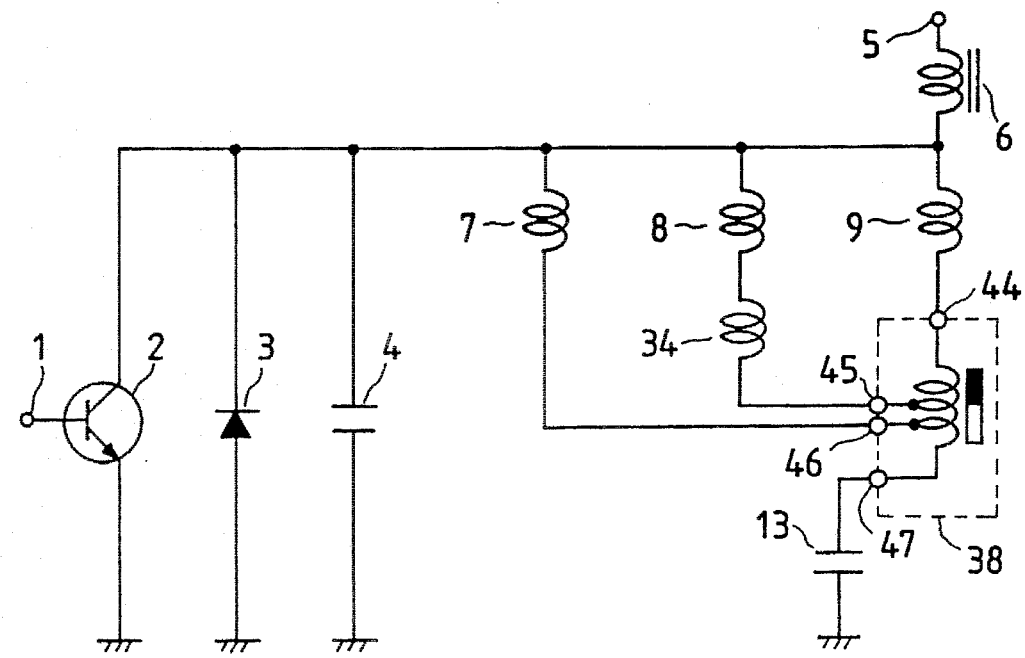
FIG. 15 is a circuit diagram of a projection display apparatus according to another embodiment of the present invention.

By adjusting the positions of the center taps 45, 46 and winding of the coil 38 using the single linearity correction coil 38, it is possible to attain a construction equal to that of the circuit illustrated in FIG. 15, wherein linearity correction coils are coupled to the horizontal deflection coils 7, 8 and 9, respectively.

Figure 16:
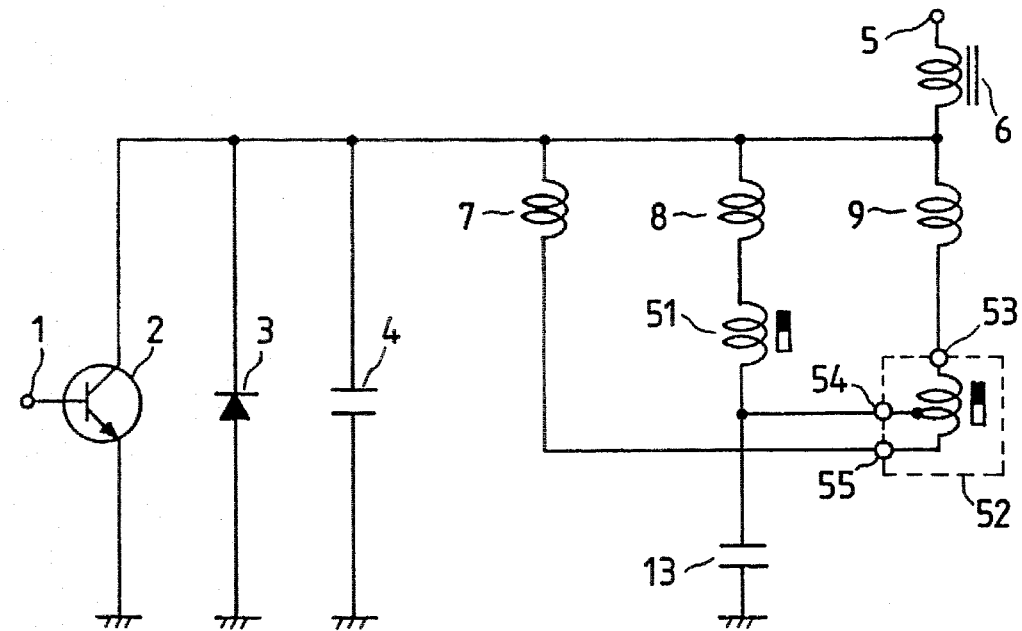
FIG. 16 is a circuit diagram of a projection display apparatus according to a further embodiment of the present invention.

FIG. 16 is a circuit diagram of a projection display apparatus according to a still further embodiment of the present invention, which include a linearity correction coil 51 and a linearity balance correcting coil 52. The coil 52 includes one end terminal 53, a center tap 54, a terminal 55 with the portions common to the foregoing drawings being indicated by the same reference numerals.

In FIG. 16, the horizontal deflection coils 7 and 9 are coupled in series with each other through the linearity balance correcting coil 52. The center tap 54 of the coil 52 is grounded through the S-correction capacitor 13. The linearity correction coil 51 is coupled at one end thereof in series with the horizontal deflection coil 8 and is coupled at the opposite end thereof with the center tap 54 of the linearity balance correcting coil 52. The horizontal deflection coil 7 and the portion from the terminal 55 to the center tap 54 of the linearity balance correcting coil 52 constitute a deflection unit for the projection tube 107, while the horizontal deflection coil 9 and the portion from the terminal 53 to the center tap of the coil 52 constitute a deflection unit for projection tube 105.

In the linearity balance correction coil 52, the number of turns N1 in the portion between the terminal 53 to which the horizontal deflection coil 9 is coupled and the center tap 54, and the number of turns N2 in the portion between the center tap 54 and the terminal 55 to which the horizontal deflection coil 7 is coupled, are set different from each other as, for example, N1:N2=2:1, whereby only an electric current corresponding to one horizontal deflection coil is superimposed on the coil of the linearity balance correcting coil 52. As a DC superimposing characteristic of the coil 52, the characteristic curve 23 shown in FIG. 1 can be set in the portion between the terminal 53 and the center tap 54, while in the portion between the center tap 54 and the terminal 55, it is possible to obtain the characteristic curve 20, shown in FIG. 1, because of a reverse direction of magnetic bias.

According to this embodiment, for example, in the case where circuit components are to be used in common to both a deflection circuit of a large-sized direct viewing tube type and a deflection circuit of a projection type, the linearity balance correcting coil 52 can be mounted to only the projection type, using the linearity correction coil 51 as a common component. Of course, it is optional whether such a construction is to be adopted or not.

According to the present invention, as set forth hereinabove, a horizontal linearity correction can be made in advance for the raster shape on the front surface of each projection tube without making correction in the convergence coil driving circuits, whereby it is made possible to diminish the burden of electric power on the convergence coils or convergence coil driving circuits. Consequently, not only the projection display apparatus can be made smaller in size, but also the magnetic field created by a convergence coil becomes smaller. As a result, there is obtained a high resolution without increasing the deflection defocus of an electron beam spot.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A projection display apparatus having three projection tubes for the projection of images of different primary colors, the images from the projection tubes being projected on an enlarged scale onto a screen through projection lenses, comprising:

a first deflection unit having at least a first deflection coil mounted on a neck portion of a first projection tube;

a second deflection unit having at least a second deflection coil mounted on a neck portion of a second projection tube;

a third deflection unit having at least a third deflection coil mounted on a neck portion of a third projection tube; and a first linearity correction coil coupled in series with a parallel connection of the second deflection unit and only one of the first and third deflection units.

2. A projection display apparatus as in claim 1, wherein the second projection tube is a tube providing a green color.

3. A projection display apparatus as in claim 1, wherein the parallel connection is the second and third deflection units.

4. A projection display apparatus as in claim 1, further comprising a second linearity correction coil coupled in series with the third deflection unit.

5. A projection display apparatus as in claim 1, further comprising a first raster size coil for controlling raster size coupled to the third deflection unit.

6. A projection display apparatus as in claim 1, further comprising a second raster size coil for controlling raster size coupled to the second deflection unit.

7. A projection display apparatus as in claim 1, further comprising a third linearity correction coil coupled to the first deflection unit.

8. A projection display apparatus as in claim 7, wherein the direction of magnetic bias of the third linearity correction coil is opposite to those of the other linearity correction coils.

9. A projection display apparatus as in claim 4, further comprising a third linearity correction coil coupled to the first deflection unit.

10. A projection display apparatus as in claim 9, wherein the direction of magnetic bias of the third linearity correction coil is opposite to those of the other linearity correction coils.

11. A projection display apparatus having three projection tubes for the projection of images of different primary colors, the images from the projection tubes being projected on an enlarged scale onto a screen through projection lenses, comprising:

a first deflection unit having at least a first deflection coil mounted on a neck portion of a first projection tube;

a second deflection unit having at least a second deflection coil mounted on a neck portion of a second projection tube;

a third deflection unit having at least a third deflection coil mounted on a neck portion of a third projection tube; and a linearity correction coil having at least first, second and third terminals, the first and second terminals being end terminals and the third terminal being an intermediate terminal disposed between the first and second terminals, at least one of the first and second terminals being coupled to one of the first and third deflection units, and the third terminal being coupled to the second deflection unit.

12. A projection display apparatus as in claim 11, further comprising a raster size coil for controlling raster size coupled to the second deflection unit.

13. A projection display apparatus as in claim 11, wherein:

the first terminal of the linearity correction coil is coupled to the third deflection unit;

the third terminal of the linearity correction coil is coupled to the second deflection unit;

the second terminal of the linearity correction coil is coupled to the first deflection unit; and the third deflection unit and the linearity correction coil constitute a deflection unit for the third projection tube, the second deflection unit and a portion of the linearity correction coil extending from the third terminal to the second terminal constitute a deflection unit for the second projection tube, and the first deflection unit and the second terminal of the linearity correction coil constitute a deflection unit for the first projection tube.

14. A projection display apparatus as in claim 11, wherein:

the linearity correction coil includes a fourth terminal disposed intermediate between the first and second terminals, the fourth terminal of the linearity correction coil being coupled to the first deflection unit;

the first terminal of the linearity correction coil is coupled to the third deflection unit;

the third terminal of the linearity correction coil is coupled to the second deflection unit; and the third deflection unit and the linearity correction coil constitute a deflection unit for the third projection tube, the second deflection unit and a portion of the linearity correction coil extending from the third terminal to the second terminal constitute a deflection unit for the second projection tube, and the first deflection unit and a portion of the linearity correction coil extending from the fourth terminal to the second terminal constitute a deflection unit for the first projection tube.

15. A projection display apparatus as in claim 11, further comprising another linearity correction coil coupled to the second deflection unit.

16. A projection display apparatus as in claim 11, wherein:

the first terminal of the linearity correction coil is coupled to the third deflection unit;

the another linearity correction coil has fourth and fifth terminals, the fourth terminal coupled to the second deflection coil and the fifth terminal is coupled to the third terminal of the linearity correction coil;

the second terminal of the linearity correction coil is coupled to the first deflection unit; and the third deflection unit and a portion of the linearity correction coil extending from the first terminal to the third terminal constitute a deflection unit for the third projection tube, the second deflection unit and the another linearity correction coil constitute a deflection unit for the second projection tube, and the third deflection unit and a portion of the linearity correction coil extending from the second terminal up to the third terminal constitute a deflection unit for the first projection tube.

17. A projection display apparatus as in claim 11, further comprising a further linearity correction coil coupled to the first deflection unit and a raster size coil having first and second terminals, the first terminal of the raster size coil being coupled to the second deflection coil.

18. A projection display apparatus as in claim 11, wherein the direction of the magnetic bias of the further linearity correction coil is opposite to that of the linearity correction coil.

19. A projection display apparatus as in claim 11, wherein:

the first terminal of the linearity correction coil is coupled to the third deflection unit;

the second terminal of the linearity correction coil is coupled to the third terminal of the linearity correction coil;

the further linearity correction coil having fourth and fifth terminals, the fourth terminal is coupled to the first deflection coil and the fifth terminal is coupled to the second terminal of the linearity correction coil;

the third deflection unit and the linearity correction coil constitute a deflection unit for the third projection tube, the second deflection unit and a portion of the linearity correction coil extending from the third terminal to the second terminal constitute a deflection unit for the second projection tube.

20. A projection display apparatus having three projection tubes for the projection of images of different primary colors, the images from the projection tubes being projected on an enlarged scale onto a screen through the projection lenses, comprising:

a first deflection unit having at least a first deflection coil mounted on a neck portion of a first projection tube;

a second deflection unit having at least a second deflection coil mounted on the neck portion of a second projection tube;

a third deflection unit having at least a third deflection coil mounted on a neck portion of a third projection tube;

a first linearity correction coil coupled in series with one of the first, second and third deflection units; and a second linearity correction coil coupled in series with another of the first, second and third deflection units;

wherein the first and second linearity correction coils are coupled to only two of the first, second and third deflection coils.

21. A projection display apparatus as in claim 20, wherein the only two of the deflection units coupled to the first and second linearity correction coils are the second and third deflection units.

22. A projection display apparatus as in claim 20, wherein the second and third projection tubes are tubes providing green and blue colors, respectively.

23. A projection display apparatus having three projection tubes for the projection of images of different primary colors, the images from the projection tubes being projected on an enlarged scale onto a screen through the projection lenses, comprising:

a first deflection unit having at least a first deflection coil mounted on a neck portion of a first projection tube and a first linearity correction coil coupled to the first deflection coil;

a second deflection unit having at least a second deflection coil mounted on the neck portion of a second projection tube and a second linearity correction coil coupled to the second deflection coil; and a third deflection unit having at least a third deflection coil mounted on a neck portion of a third projection tube and a third linearity correction coil coupled to the third deflection coil;

wherein the direction of magnetic bias of the first linearity correction coil is opposite to those of the second and third linearity correction coils.

24. A projection display apparatus as in claim 23, further comprising a raster size coil for controlling raster size coupled to the second deflection unit.

25. A projection display apparatus as in claim 23, further comprising one raster size coil for controlling raster size coupled to the first deflection unit and another raster size coil coupled to the third deflection coil.

26. A projection display apparatus having three projection tubes for the projection of images of different primary colors, the images from the projection tubes being projected on an enlarged scale onto a screen through the projection lenses, comprising:

a first deflection unit having at least a first deflection coil mounted on a neck portion of a first projection tube and a first linearity correction coil coupled to the first deflection coil;

a second deflection unit having at least a second deflection coil mounted on the neck portion of a second projection tube and a second linearity correction coil coupled to the second deflection coil; and a third deflection unit having at least a third deflection coil mounted on a neck portion of a third projection tube and a third linearity correction coil coupled to the third deflection coil; and a raster size coil for controlling raster size coupled to only one of the first, second and third deflection units.

27. A projection display apparatus as in claim 26, wherein the raster size coil is coupled to the second deflection units.

28. A projection display apparatus as in claim 26, wherein the second projection tube is a tube providing a green color.

29. A projection display apparatus having three projection tubes for the projection of images of different primary colors, the images from the projection tubes being projected on an enlarged scale onto a screen through the projection lenses, comprising:

a first deflection unit having at least a first deflection coil mounted on a neck portion of a first projection tube and a first linearity correction coil coupled to the first deflection coil;

a second deflection unit having at least a second deflection coil mounted on the neck portion of a second projection tube and a second linearity correction coil coupled to the second deflection coil; and a third deflection unit having at least a third deflection coil mounted on a neck portion of a third projection tube and a third linearity correction coil coupled to the third deflection coil;

a first raster size coil for controlling raster size being coupled to only one of the first, second and third deflection units; and a second raster size coil for controlling raster size being coupled to another of the first, second and third deflection units;

wherein the first and second raster size coils are coupled to only two of the first, second and third deflection units.

30. A projection display apparatus as in claim 29, wherein the first and second raster size coils are coupled to the first and third deflection units.

31. A projection display apparatus as in claim 30, wherein the first and third projection tubes are tubes providing red and blue colors, respectively.

32. A projection display apparatus having three projection tubes for the projection of images of different primary colors, the images from the projection tubes being projected on an enlarged scale onto a screen through projection lenses, comprising:

a first deflection unit having at least a first deflection coil mounted on a neck portion of a first projection tube and a first linearity correction coil coupled to the first deflection coil;

a second deflection unit having at least a second deflection coil mounted on a neck portion of a second projection tube and a second linearity correction coil coupled to the second deflection coil; and a third deflection unit having at least a third deflection coil mounted on a neck portion of a third projection tube and a third linearity correction coil coupled to the third deflection coil;

wherein the direction of magnetic bias of the third linearity correction coil is opposite to the direction of magnetic bias of the first and second linearity correction coils, the second deflection unit is coupled in parallel with the third deflection unit, and the first deflection unit is coupled in parallel with the second deflection coil.

\* \* \* \* \*